Sept. 10, 1963 I. DORROS 3,103,647

TRANSMITTER AND RECEIVER SIGNALING CIRCUITS

Filed July 1, 1959 2 Sheets-Sheet 1

INVENTOR
I. DORROS
BY
S.E. Hollander
ATTORNEY

INVENTOR
I. DORROS
BY S.E. Hollander
ATTORNEY

United States Patent Office 3,103,647

Patented Sept. 10, 1963

3,103,647

TRANSMITTER AND RECEIVER SIGNALING CIRCUITS

Irwin Dorros, Livingston, N.J., assignor to Bell Telephone Laboratories, Incorporated, New York, N.Y., a corporation of New York Filed July 1, 1959, Ser. No. 824,433

23 Claims. (Cl. 340—167)

This invention pertains to telephone systems and more specifically to signaling circuits for use in remote line concentrator portions of electronic telephone systems.

A remote line concentrator is a system utilized to reduce the cost and complexity of telephone transmission facilities. A line concentrator accomplishes this by providing service between a central office and a given number of subscribers by means of a lesser number of lines or trunks. Line concentrator circuitry is advantageous in the reduction of the cost of the materials utilized in connecting a given number of subscribers to a central office.

A remote line concentrator system provides a number of trunks statistically sufficient to handle the calls to and from a larger number of subscribers. In such a system none of the subscriber terminating circuitry is directly connected to a trunk from the central office, so means are required to accomplish such connection when service is desired. Such means, generally, must include not only the actual switching components but, in addition, means for determining what switching is to be accomplished and means for controlling that switching. Since, in most instances, it is desirable that the remote circuitry be as compact as possible, the general control of switching is reposed in the central office circuitry. If, then, the central office is to determine and control the switching of the various subscribers to the various trunks, it is necessary that the central office be apprised of the present state of each of the various subscriber terminating circuits and of the trunks.

In determining the state of the subscriber circuitry, an investigation of the voltages or currents therein is required. The results of this investigation are relayed to the central office by some form of connecting circuitry. Generally, the electronic signals utilized in the subscriber circuitry differ from those which may be utilized by the connecting circuitry. For instance, in some subscriber circuitry it is advantageous to employ decaying positive voltage pulses to operate the various components. On the other hand, to reduce expense the apparatus connecting the subscriber circuitry to the central office should advantageously utilize a standard form of telephone cable which may have a bandwidth limited to a narrow range of the audio region. Any pulsed information transmitted by such a cable must have its major frequency components within that narrow range to prevent prohibitive attenuation. It is therefore desirable that some form of signaling circuitry be interposed between the subscriber circuitry and the connecting circuitry to convert the pulses adaptable for use in the first to pulses adaptable for use in the latter, and vice versa.

It is desirable that any signaling circuitry adapted for use in a remote line concentrator be capable of handling as much information as possible in order to reduce the total number of components and thus facilitate compactness and reduce over-all expense. One method of providing that a circuit handle a large amount of information is to make it responsive in different manners to pulses of opposite polarity. That is, in a signaling circuit utilizing sinusoidal input pulses, for instance, the positive portion is made to effect a different output than the negative portion of the wave. A means of accomplishing the foregoing is to provide that the signaling circuitry include a separate channel for each polarity component.

In order both to interrogate the state of the subscriber circuitry and to effect a change in the connection thereof, it is necessary that the signaling circuitry be capable of passing signals in both directions. To pass signals in both directions, which also increases signal handling capability, the signaling circuitry includes a transmitter and a receiver. Such a transmitter and a receiver, if they are to operate on pulses of both polarities, are designated as bipolar and each includes two channels, one for each polarity of the wave or signal to be utilized.

One arrangement for coupling signaling circuitry to lines connected to the central office utilizes transformers to accomplish the coupling. When transformer coupling is utilized, the inductance of the transformer and the capacitance of the lines connected thereto cause some oscillations due to tuning. This tuning is such that, if sinusoidal waves are to be passed by the transformer, input waves appearing in pulses of a single polarity, half-sinusoids, will produce an output pulse which includes an overshoot pulse of the opposite polarity. This overshoot, caused by the tuned circuit effect mentioned priorly, is aided by the collapse of the mutual field of the transformer. If the channels of the signaling circuitry are adapted to operate responsive to pulses of opposite polarity and an input pulse contains overshoot, it is possible that the overshoot may falsely operate an improper channel. It is therefore desirable that the signaling circuit include means for eliminating the undesirable effect of overshoot from the output of the receiver portion thereof.

In addition, it is desirable that the transmitter portion of the signaling circuitry be capable of producing a pulse from which the effect of overshoot may be easily eliminated when the transmitter portion is used to transmit signals to a receiver of the aforementioned type.

In any circuitry utilized in a large system, where component and circuit duplication occur, simplicity, and compactness are of prime importance. Further, the various components utilized should themselves be as small and as inexpensive as possible within the tolerances required for operation.

It is therefore an object of this invention to improve bipolar transmitter-receiver signaling in telephone systems.

Another object of this invention is to eliminate the deleterious effect of overshoot caused by transformer coupling in the input of a bipolar receiver used in signaling systems.

Another object of this invention, in one specific embodiment thereof, is to provide a bipolar transmitter, transformer-coupled to a line, which produces a pulse from which the deleterious effect of pulse overshoot may be easily eliminated.

A more general object of this invention is to simplify and reduce the cost of signaling circuits used in telephone systems by the use of a bipolar transmitter-receiver utilizing various compact and inexpensive components.

Briefly, the foregoing objects are accomplished in accordance with aspects of this invention by a signaling circuit which includes a bipolar transmitter and a bipolar receiver, both of which make use of semiconductor bistable switches, which may be of the type disclosed in Patent 2,855,524 of W. Shockley, issued October 7, 1958. These switches are current dependent and may advantageously be operated in conductive or nonconductive states, exhibiting negligible impedance to current flow in the first, and very high impedance in the second-mentioned state.

The bipolar receiver is a two-channel circuit. Each channel includes an input transistor biased to operate upon a pulse of one polarity, opposite that of the pulse which operates the input transistor of the other channel. Input pulses are provided to the transistors of the two channels from the line to the central office by transformer coupling means. The output of each transistor is utilized to break down a PNPN bistable switch in that channel. Each switch is connected to the output terminal of that channel and to a charged capacitor which provides, upon break-down of the switch, a decaying positive output pulse to the output terminal. In addition, the reduction of the charge on the capacitor advantageously turns off the PNPN switch upon the diminution of current therethrough.

To overcome the problem caused by transformer overshoot at the input, the operating bias on each input transistor is controlled by an internal feedback circuit connected from the output of both channels. This feedback circuit includes a monostable multivibrator for changing the potential at the input transistors. The multivibrator is adapted to apply a disabling potential at both input transistors immediately upon receipt of an output pulse so that only the leading edge of an input pulse is effective to operate either channel. Disabling potential is maintained for a period such that any overshoot caused by the transformer coupling is ineffective to operate an improper channel.

Specifically, the multivibrator circuit has its input connected at the output of both receiver channels. This input is connected to operate a PNPN switch to provide a quick charge from a potential source at one terminal of the switch to a capacitor at the other terminal thereof. The equalization of potential reduces the current through the switch to a point at which it turns off. The newly-charged capacitor controls the base of a normally saturated transistor to render it nonconductive. In the saturated state, the transistor applies ground to the emitters of the input transistors to enable their operation. During the nonconductive state the potential at the collector of this transistor is applied at the emitters of the input transistors of each channel to preclude their operation. The input transistors are maintained off for a sufficient time to allow for dissipation of the overshoot. This time is controlled by the time required for the newly-charged capacitor to discharge over a path containing a single resistor. Since the path includes only a single capacitor and a single resistor, the time of discharge is very accurately controllable. When the charge on the capacitor has dissipated to a certain point the multivibrator transistor saturates and applies ground to the emitters of the input transistors to allow operation thereof.

The bipolar transmitter of the signaling circuit is adapted to operate upon reception of decaying positive input pulses from the subscriber terminating equipment. Two channels are provided, each of which includes a PNPN switch adapted to break down upon receipt of an input pulse and apply the charge on a capacitor connected thereto through the switch to a capacitor of a tuned circuit. The equalization of charge between capacitors on each side of the switch removes sustaining current, and the switch opens.

The quick charge applied to the capacitor of the tuned circuit initiates oscillations therein which are applied at the input of a transistor in each channel. The transistor of each channel is biased to operate on an input pulse of a single polarity. The transistor of each channel is connected to produce an output pulse of a polarity opposite that produced by the other channel. An input pulse in one channel from the tuned circuit thereof having a polarity opposite that required to operate the transistor of that channel is damped by a critical-damping resistor connected in shunt with the input of the transistor. The transistor output is connected to a transformer which provides the coupling to the line circuit connected to the central office from which the receiver receives its input. Since the tuned circuit produces a sinusoidal input to affect the transistor of each channel, the transistor produces a half-wave sinusoidal output which it transfers to the line and which is, in turn, transferred to the central office.

In one specific embodiment of the transmitter circuit of this invention means are provided for producing an output pulse from which the effect of the overshoot inherent in transformer coupling may be easily eliminated. In direct contrast to other transmitters wherein attempts are made to eliminate overshoot from the output to eliminate the effect thereof, the transmitter of the present invention in this one embodiment emphasizes the inherent overshoot to eliminate its effect. The transistors of the two channels are biased to operate on inputs of opposite polarity. A cross-coupling circuit is provided between channels which allows the normally unused portion of the input from the tuned circuit of each channel to operate the transistor of the other channel and force the transformer overshoot to take place in a shortened amount of time immediately following the desired output pulse. The effect of the overshoot may then be eliminated from such a pulse by a receiver of the type herein illustrated wherein either channel is operated by the leading edge of an input pulse and both channels are then disabled for a given period. As long as the overshoot from the transmitter takes place within the disabling period, and since the overshoot is forced to take place immediately after the desired output, its effect is thus eliminated.

A feature of this invention relates to the provision of an input transistor for each channel of a bipolar receiver. Each transistor is advantageously biased by feedback means in a manner to eliminate the effect of overshoot in input pulses.

Another feature of this invention and especially of the receiver portion thereof relates to the novel feedback means for precluding the effect of overshoot on the input channels, the means including a PNPN controlled transistor multivibrator capable of closely timed operation.

Another feature of this invention in the transmitter portion thereof pertains to the use of a PNPN crosspoint in series with a charged capacitor to produce a quick charge to initiate oscillations in a tuned circuit.

An additional feature of this invention in the transmitter portion thereof relates to the use of a tuned circuit to control the input to a transistor whereby the transistor produces a sinusoidal output. This circuit advantageously contemplates the use of a critical damping resistor to damp oscillations in the tuned circuit after the first half-wave has been utilized by the transistor.

Another feature of this invention in one specific embodiment of the transmitter portion thereof resides in the use of a cross-coupling network between the two channels whereby an accentuated overshoot is produced. The output wave including this overshoot is advantageously such that the effect of the overshoot may be easily eliminated by a receiver of the type disclosed herein.

There and other objects and features of this invention will be better understood upon consideration of the following detailed description and the accompanying drawing, in which.

Figures 1, 2:
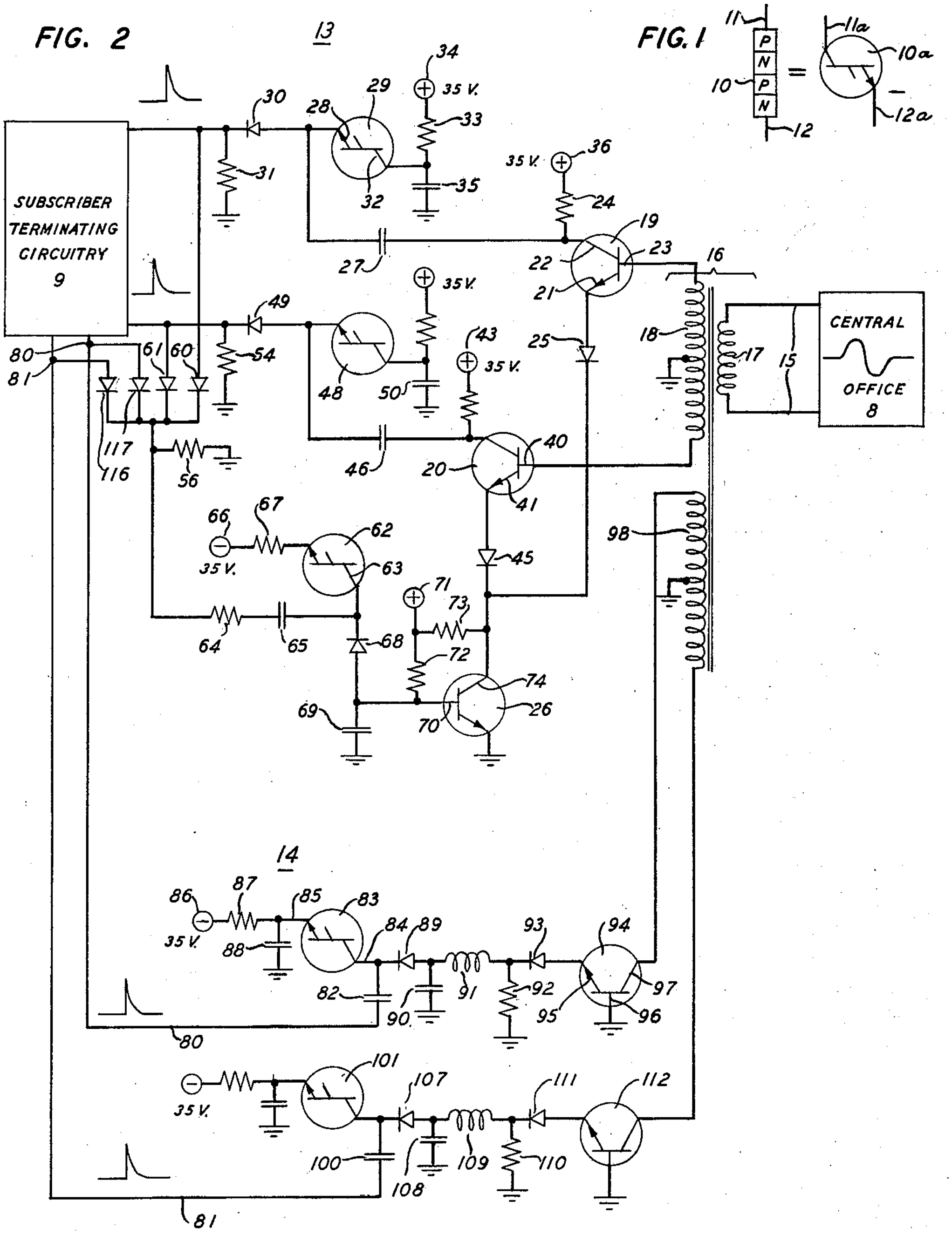
FIG. 1 is a diagram equating the symbolism employed heretofore to describe a two-terminal PNPN transistor with that employed in the present drawing.
FIG. 2 is a schematic representation of a bipolar transmitter-receiver signaling circuit illustrative of various aspects of this invention.

Referring now to FIG. 1 there is shown in block form a PNPN semiconductor switch 10 which may be of a type such as is disclosed in the Shockley patent, mentioned supra. Such a semiconductor switch 10 advantageously has an operating characteristic wherein it displays a very high impedance to current flow of less than a predetermined value and a substantially negligible impedance to current flow of greater than that value. Thus such a semiconductor 10 will operate as a switch with appropriate voltages applied. If a voltage, less than that appropriate to cause the predetermined value of current to flow, is applied across the terminals of the switch 10, the switch 10 acts as an open circuit. If the voltage is increased to a point where the predetermined current or greater flows, the switch 10 shifts to a condition wherein it appears as substantially a short circuit. In this condition a very small voltage is required to supply the predetermined amount of current required to maintain the switch in the low impedance state. If the current drops below the predetermined value, the switch 10 reverts to the high impedance state.

The switch 10, as illustrated, includes alternate layers of semiconductor material, a first terminal 11, and a second terminal 12. Equated thereto in schematic form is an identical PNPN switch 10A having a first terminal 11A and a second terminal 12A.

Referring to FIG. 2 there is shown connecting a central office 8 to subscriber terminating circuitry 9 a signaling circuit including a bipolar receiver 13 and a bipolar transmitter 14, each connected by a line 15 to central office 8 through a transformer 16.

*Bipolar Receiver*

The receiver 13 is adapted to operate upon the receipt of pulses of either polarity from the line circuit 15. These pulses are received from the central office 8 and coupled by a primary winding 17 of the transformer 16 to a secondary winding 18 thereof. Connected to the winding 18 at opposite ends thereof are a first transistor 19 and a second transistor 20, biased, as explained hereinafter, in a manner to operate upon the receipt of pulses of opposite polarity. The winding 18 is connected to ground at its center.

The transistor 19 includes a base 23, an emitter 21, and a collector 22 and may advantageously be of the NPN type, as illustrated. The base 23 is connected to the winding 18. The collector 22 is connected to a source of positive potential 36 through a resistor 24. The emitter 21 is connected through a diode 25 and a normally saturated transistor 26 to ground. Since in the absence of input, ground is normally maintained at emitter 21 and base 23, the transistor 19 is nonconducting; an input pulse of positive polarity from the transformer winding 18 at the base terminal 23 then causes the transistor 19 to saturate, reducing the potential at the collector 22 to ground potential and producing a negative output pulse substantially equal to the value of the potential furnished by the source 36.

The negative output pulse is coupled by a capacitor 27 to a terminal 28 of a PNPN semiconductor switch 29. The terminal 28 is biased through a diode 30 and a resistor 31 at ground potential, until the advent of a negative pulse. The switch 29 includes a terminal 32 which is connected through a resistor 33 to a source of positive potential 34, and is coupled by a capacitor 35 to ground.

In the off-state of the switch 29 the capacitor 35 charges to the potential furnished by the source 34. With the terminal 28 at ground, this voltage is inadequate to cause the switch 29 to switch to the low impedance state. The negative pulse furnished by the transistor 19 to the terminal 28 increases the voltage across the switch 29 sufficiently to raise the current to a value capable of changing the switch 29 to its low impedance condition. The switch 29 shifts to the low impedance condition; and the current therethrough, provided by the charge on the capacitor 35, produces a decaying output pulse across the resistor 31 for the subscriber terminating circuitry 9. As the capacitor 35 discharges, the current through the switch 29 advantageously becomes insufficient to maintain the switch 29 in the low impedance condition so it reverts to the high impedance condition terminating the output pulse.

The transistor 20 provides an input to a second channel which functions in a manner substantially identical to that of the channel including the transistor 19. The transistor 20, however, has a base 40 connected to the end of the winding 18 opposite that to which the base 23 is connected so that the base 40 receives positive pulses while the base 36 is receiving negative pulses, and vice versa. The transistor 20 has an emitter connected by a diode 45 to the normally saturated transistor 26 whereby operating bias is furnished. The channel including the transistor 20 comprises an output path including a capacitor 46, a PNPN switch 48, a diode 49, and an output resistor 54 connected to ground. The switch 48 operates in a manner identical to the switch 29 to furnish decaying output pulses across the resistor 54. Like components in the channel including the transistor 19 may be substantially identical to like components in the channel including the transistor 20.

If a single input pulse at the line 15 to the receiver 13 includes any overshoot or derives any overshoot from the transformer coupling due to line capacitance or transformer inductance, a first one of the transistors 19 or 20 will operate and then a second one of those transistors 19 or 20 will operate, on the pulse and its accompanying overshoot. Since it is desirable that a single input pulse produce an output pulse on but a single channel, means may be provided for disabling the improper channel to preclude its producing an output due to overshoot.

In the present invention this preclusion is accomplished by feedback circuitry which includes a diode 60 connected to the output of the channel of transistor 19 at the resistor 31, and a diode 61 connected to the output of the transistor 20 at the resistor 54. The diodes 60 and 61 are connected together and to a PNPN semiconductor switch 62 at a terminal 63 thereof through a resistor 64 and a capacitor 65. The switch 62 is connected to a source of negative potential 66 through a resistor 67, the potential furnished by source 66 being inadequate of itself to operate switch 62 in the low impedance state. The terminal 63 is connected through a diode 68 and a capacitor 69 to ground. The capacitor 69 is additionally connected to the transistor 26 at a base 70 thereof. The base 70 is connected to a source of positive potential 71 by a resistor 72. The source 71 is utilized further to bias a collector 74 of the transistor 26 through a resistor 73. The biasing of the transistor 26 is advantageously such that the transistor is normally saturated, thus furnishing ground to the terminal 63 to maintain the switch 62 in the high impedance condition.

A positive output pulse across either the resistor 31 or the resistor 54 is adequate to raise the potential across the switch 62 sufficiently to cause it to switch to its low impedance condition. The series resistor 67 is of a small value, and when the switch 62 shifts to the low impedance state, the source 66 furnishes a quick negative charge to the capacitor 69, and the value of potential at the capacitor 69 becomes equal to that furnished by the source 66 whereupon insufficient current flows to maintain the switch 62 in the low impedance state, and it reverts to the high impedance state. The quick charge acts as a negative pulse applied at the base of the transistor 26 and causes that transistor 26 to become nonconductive. As the transistor 26 ceases to conduct the potential from source 71 is applied to the emitters 21 and 41 of the transistors 19 and 20, respectively. The source 71 advantageously furnishes a potential equal to that furnished by the sources 36 and 43, so both transistors 19 and 20 become inoperative.

This biasing is accomplished immediately upon receipt at the output of the leading edge of a positive output pulse, and since the leading edge of an input pulse initiates the output, only the initial portion of any input pulse from the line 15 is passed by the appropriate transistor 19 or 20. The effect of overshoot on the receiver 13 is therefore advantageously precluded since both input transistors 19 and 20 are blocked following the initial portion of any input pulse. The time of blocking is controlled by adjusting the values of the capacitor 69 and the resistor 72 to extend over the period including overshoot.

Further, since the switches 29 and 48 operate upon the advent of a leading edge of an input pulse from the associated transistors 19 and 20 to produce a decaying output pulse, and since the feedback circuitry immediately acts to disable both input transistors 19 and 20, the input pulses from the transformer 16 have no effect on the output wave form which is due solely to the discharge of the capacitors 35 and 50. Advantageously, during the disable period of the transistors 19 and 20, the output of the receiver 13 is invulnerable to spurious noises from the line 15. By adjusting the disabled period random errors due to such spurious noises may be greatly reduced.

*The Bipolar Transmitter*

The bipolar transmitter 14 has a first input terminal 80 and a second input terminal 81 at which are received exponentially decaying positive pulses indicative of the conditions of the various portions of the subscriber terminating circuitry 9 connected thereto. These pulses are advantageously affected by the transmitter 14 so that they may be in proper form for utilization by the line circuit 15 connected thereto, as will be explained hereinafter.

Each of the terminals 80 and 81 connects to a separate transmission channel; the channel to which the terminal 80 is connected will be discussed first. The terminal 80 is coupled by a capacitor 82 to a PNPN bistable semiconductor switch 83 at a terminal 84 thereof. The switch 83 has a terminal 85 connected to a source of negative potential 86 by a resistor 87 and coupled to ground by a capacitor 88. The potential furnished by the source 86 is insufficient by itself to operate the switch 83 in its low impedance condition, but is advantageously adequate with the positive voltage input pulse at the terminal 80 to supply sufficient current to the switch 83 to cause that switch 83 to operate in the low impedance state.

Prior to the time at which the switch 83 shifts to the low impedance state, the potential furnished by the source 86 is applied to charge the capacitor 88. Upon the breakdown of the switch 83 and the immediate termination of the input pulse at the terminal 80, the charge on the capacitor 88 distributes through a path including a diode 89 connected to the terminal 84 of the switch 83 and a capacitor 90 connected to the diode 89 and to ground. Since the impedance through the switch 83 and the diode 89 is very low, the charge on the capacitor 88 distributes between that capacitor 88 and the capacitor 90 in a short period of time. Capacitors 88 and 90 are of substantially equal value, and the charge equalizes therebetween. With the voltage at each capacitor being approximately equal, insufficient current is provided to maintain the switch 83 in the low impedance state, and it reverts to the high impedance state.

When the switch 83 reverts to the high impedance state a negative voltage remains on the capacitor 90. Connected to the capacitor 90 is an inductor 91, advantageously of a value such as to provide resonance at a frequency adaptable for utilization by the line 15. The charge produced by the quick partial discharge of the capacitor 88 begins to leak from the capacitor 90 advantageously initiating oscillations in the tuned circuit comprising that capacitor 90 and the inductor 91. The inductor 91 is connected to a resistance 92 and a diode 93. The diode 93 is in turn connected to an NPN transistor 94 at the emitter 95 thereof. Transistor 94 has a base

96 connected to ground and a collector 97 connected to one end of a winding 98 of the transformer 16.

The transistor 94 is advantageously biased so that the polarity of the first half-cycle of oscillations is appropriate to initiate current flow between the base 96 and the emitter 95, causing an output current to flow in the circuit including the collector 97. This current is a replica of the input current to the emitter 95, i.e., if the input is sinusoidal in form, so is the output. Since the tuned circuit including capacitor 90 and the inductor 91 produces sinusoidal oscillations, the output produced at the collector 97 is also in the form of sinusoidal oscillations.

However, current flows in the collector circuit only during a first half-cycle of the oscillations when the emitter 95 is negative to the base 96 due to the input. Both the diode 93 and the transistor 94 are in the nonconductive state for the other half-cycle of oscillations, and the current during that period flows through the resistor 92. The resistor 92 is chosen of a value appropriate to produce critical damping of the oscillations thus preventing any subsequent positive swings. Thus the circuit including the transistor 94 is advantageously adapted to produce an output of half-sinusoidal waves which may be transferred to and utilized by the line circuit 15.

The channel including the input terminal 81 operates in a like manner connected to provide an output pulse to the winding 98. The path includes an input capacitor 100; a PNPN switch 101; a diode 107; a tuned circuit comprising a capacitor 108, an inductor 109, and a resistor 110; a diode 111, and an output transistor 112 directly connected to the winding 98. The values of the components in this second channel may be substantially identical to the values of like components in the channel including input terminal 80. Thus a positive input pulse at the terminal 81 operates to break down the crosspoint 101, distribute a negative charge to the capacitor 108, and produce oscillations of a usable frequency for transfer to the line circuit 15. The output pulses produced by the transformer 16 through the operation of the transistors 94 and 112 are advantageously opposite in polarity due to the connection of the transistors 94 and 112 at opposite terminals of the winding 98.

The circuit of FIG. 2, including bipolar receiver 13 and bipolar transmitter 14, is adaptable to receive sinusoidal pulses from and to produce sinusoidal pulses for transfer to the line circuit 15. The transmitter channel including the input terminal 80 operates to produce an output pulse of a first polarity while the channel including the input terminal 81 operates to produce an output pulse of the opposite polarity, both of which pulses are sinusoidal in form and thus may be utilized efficiently by the line circuit 15. In order, however, to preclude interference between the output of the transmitter 14 and the input to the receiver 13, each of the input terminals 80 and 81 is individually connected through diodes 116 and 117, respectively, to the resistor 64 of the receiver 13. In this manner an input pulse at either terminal 80 or 81 operates the feedback multivibrator including the switch 62 and the transistor 26 to raise the potentials at the emitter terminals 21 and 41 of the transistors 19 and 20 and preclude the operation of those transistors 19 and 20 during the operation of the transmitter 14.

Figure 3:
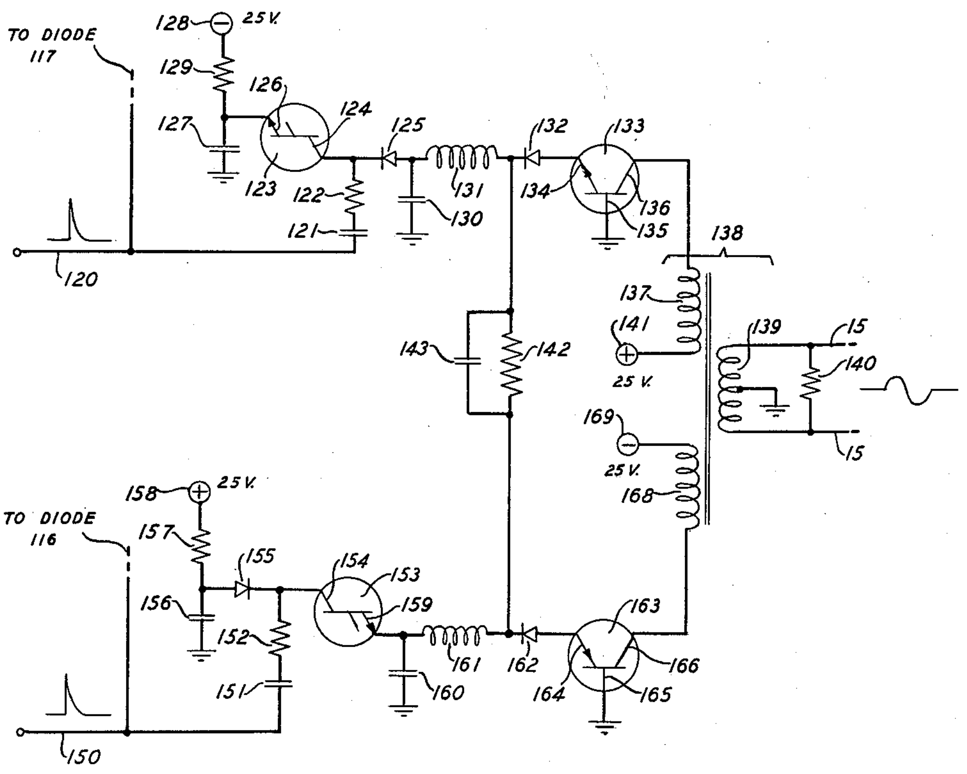
FIG. 3 is a schematic representation of a bipolar transmitter utilized to produce pulses from which the effect of overshoot may be easily eliminated.

Referring now to FIG. 3, there is shown a bipolar transmitter circuit which may be utilized in place of the transmitter circuit 14 of FIG. 2 when it is desired to produce output pulses from which the effect of any overshoot created by the transformer coupling to the line circuit 15 may be easily eliminated. This circuit, in contrast to prior art devices, emphasizes the inherent overshoot present due to transformer coupling in order to eliminate the effect of that overshoot.

The transmitter of FIG. 3 comprises two channels, the first of which includes input terminal 120 adapted to receive exponentially decaying positive input pulses. Input terminal 120 is connected by a capacitor 121 and a resistor 122 to a PNPN switch 123 at a terminal 124 thereof. The switch 123 has a terminal 126 coupled to ground through a capacitor 127 and connected to a source of negative potential 128 by a resistor 129. The switch 123 operates upon the advent of an input pulse at the terminal 120 to switch to its low impedance state and transfer a portion of the charge on capacitor 127 to a capacitor 130 connected to the terminal 124 by a diode 125. After quickly transferring this charge to the capacitor 130, the switch 123 shifts to its high impedance state due to the diminution of current therethrough.

The capacitor 130 is connected to an inductor 131 of a value appropriate to produce oscillations of a frequency adaptable to use by the line circuit 15, mentioned heretofore with reference to FIG. 2. The inductor 131 is connected through a diode 132 to an NPN transistor 133 at an emitter 134 thereof. The transistor 133 has a base 135 connected to ground and a collector 136 connected to a winding 137 of a transformer 138. Transformer 138 includes a secondary winding 139 which has connected thereacross a resistance 140, has its center grounded, and is connected to the line 15. The winding 137 is connected to a source of positive potential 141.

An input pulse at the terminal 120, initiating the charging of the capacitor 130, is operable to produce a first half-sinusoidal output at the winding 137 through the transistor 133. The second half-cycle back-biases the transistor 133, rendering it nonconductive, whereupon current flows through a resistor 142 connected to the inductor 131 and having in shunt therewith a capacitor 143. The resistor 142 is advantageously of a value such as to produce critical damping of the oscillations in the tuned circuit.

The second input channel comprises an input terminal 150 connected through a capacitor 151 and a resistor 152 to a PNPN switch 153 at a terminal 154 thereof. Terminal 154 is connected through a diode 155 to the capacitor 156 and to ground. The terminal 154 is further connected to a source of positive potential 158 through the diode 155 and a resistor 157. The switch 153 is connected to a tuned circuit including a capacitor 160 and an inductor 161. The input pulse at the terminal 150 initiates breakdown of the switch 153 to transfer a portion of the positive charge on the capacitor 156 to the capacitor 160, thus initiating oscillations in the tuned circuit.

The inductor 161 is connected by a diode 162 to a PNP transistor 163 which is in turn connected to a winding 168 of the transformer 138. The winding 168 is connected to a source of negative potential 169. Sinusoidal oscillations initiated in the tuned circuit including the capacitor 160 and the inductor 161 are such as to cause current to flow through the transistor 163 during the first half-cycle thereof, so that a sinusoidal output is produced by the winding 168 during the period. However, during the second half-cycle wherein the emitter 164 is biased negatively, current flows through the resistor 142 which is connected to the inductor 161.

The second half-cycle of oscillations in each tuned circuit cannot operate the transistor 133 or 163 included in that channel. Therefore, the current is caused to flow through the resistor 142 and the capacitor 143. This current is of a polarity such that it is effective to operate the transistor 133 or 163 of the opposite channel in a manner such as to cause the transformer 138 to produce an output of opposite polarity to that caused by the first half-cycle.

Since it is, as a practical matter, almost impossible to eliminate overshoot in pulses transferred by transformer couplings, the effect of the overshoot, rather than the overshoot itself must be eliminated. One means of accomplishing this is that means utilized in the receiver 13 of FIG. 2 wherein the receiving channels operate for a time equal to less than the first half-cycle and are precluded from operation for a period thereafter so that overshoot pulses have no effect thereon. Prior art transmitters, in attempting to eliminate overshoot from the transmitter output pulse, produce a pulse containing an overshoot of long duration which the aforementioned receiver preclusion is inadequate to entirely eliminate. If the receiving portion, not shown, connected to the line 15 at the central office is of the same type as the receiver 13 of FIG. 2, then the effect of overshoot may be eliminated by forming the pulses transmitted thereto in a manner such that the overshoot encompasses a short period of time rather than the extended period which is the normal case when no compensation is provided in tranmission. Thus the pulse and its accompanying overshoot (i.e., the "overshoot pulse") may be said to be "forced" into a shorter-than-usual time period, in order to accomplish the desired overshoot preclusion as hereinafter described.

The circuit of FIG. 3 advantageously accomplishes this shortening of overshoot by causing the second and unwanted portion of the oscillations of the tuned circuit of either channel to operate the transistor of the opposite channel. The pulse transferred to the line 15 by the first half of the wave caused by the tuned circuit of either channel includes a half-sinusoid of a first polarity and an overshoot of the opposite polarity of much less amplitude but of an extended duration, e.g., one-hundred times as long. In operating the transistor of the second channel independently, a second output pulse is produced including a half-sinusoid of the aforementioned opposite polarity and an extended overshoot of the first polarity. If the two pulses are superimposed on a single line, as they are by the single transformer 138, and the coupling network including the resistor 142 and the capacitor 143, the resulting pulse appears as substantially a complete sinusoid, the overshoots having approximately cancelled each other. The complete sinusoid easily fits within the time duration afforded by a receiver for overshoot preclusion, while a single pulse with overshoot would not. Thus the pulse received by the line 15 appears as a complete sinusoid which is readily adaptable to operate receiver circuitry connected to the line 15, not shown, upon the advent of its leading edge.

The components of the circuit described in FIG. 2 may advantageously take the following illustrative values.

| | | |
|---|---|---|
| Resistors: | | |
| **67** | ohms | 390 |
| **64** | do | 1000 |
| **31** | do | 1000 |
| **54** | do | 1000 |
| **92** | do | 4000 |
| **110** | do | 4000 |
| **56** | do | 10,000 |
| **87** | do | 10,000 |
| **73** | do | 50,000 |
| **24** | do | 50,000 |
| **33** | do | 100,000 |
| **72** | do | 100,000 |
| Capacitors: | | |
| **88** | μf | .05 |
| **90** | μf | .05 |
| **108** | μf | .05 |
| **69** | μf | .01 |
| **35** | μμf | 3000 |
| **50** | μμf | 3000 |
| **27** | μμf | 1000 |
| **46** | μμf | 1000 |
| **65** | μμf | 1000 |
| **82** | μμf | 1000 |
| **100** | μμf | 1000 |
| Inductors: | | |
| **91** | H | 0.242 |
| **109** | H | 0.242 |

Switches:

| | | |
|---|---|---|
| 29 | | Breakdown potential: 40–60 volts. Sustaining current: 1–5 ma. |
| 48 | | |
| 62 | | |
| 83 | | |
| 101 | | |

Transistors:

| | |
|---|---|
| 19 | WE 2N560 |
| 20 | WE 2N560 |
| 26 | WE 2N560 |
| 94 | WE 2N560 |
| 112 | WE 2N560 |

The components of the transmitter of FIG. 3 may advantageously take the following illustrative values.

Resistors:

| | |
|---|---|
| 129 | 6200Ω |
| 157 | 6200Ω |
| 122 | 2700Ω |
| 152 | 2700Ω |
| 142 | 300Ω |
| 140 | 300Ω |

Capacitors:

| | | |
|---|---|---|
| 127 | μf | 0.2 |
| 156 | μf | 0.2 |
| 143 | μf | 0.2 |
| 130 | μf | 0.2 |
| 160 | μf | 0.2 |
| 121 | μμf | 1000 |
| 151 | μμf | 1000 |

Inductors:

| | | |
|---|---|---|
| 131 | H | 0.0631 |
| 161 | H | 0.0631 |

Switches:

| | |
|---|---|
| 153 | Breakdown potential: 40–60 volts. Sustaining current: 1–5 ma. |
| 125 | |

Transistors:

| | |
|---|---|
| 133 | WE 2N560 |
| 163 | WE 12E |

It is to be understood that the above-described arrangements are illustrative of the applications of the principles of this invention. Numerous other arrangements may be devised by those skilled in the art without departing from the spirit and scope of the invention.

What is claimed is:

1. A signaling circuit for transferring pulses between circuits comprising a transmitter having input means, output means, a tuned circuit connected to said input means, and gating means connecting said tuned circuit and said output means and operative responsive to pulses of a single polarity; a bipolar receiver comprising a first channel and a second channel operative respectively on pulses of opposite polarity, each of said channels including input means, output means, switching means connecting said input and output means operative in response to pulses of a single polarity, and feedback means connected to said output means of both of said channels and said switching means for disabling both of said channels in response to an output signal from either of said channels; and means including said feedback means for disabling said receiver in response to an input signal at said input means of said transmitter.

2. A signaling circuit as in claim 1 wherein said transmitter includes two of said input means, two of said output means, two of said tuned circuits, and two of said gating means arranged in two distinct transmitting channels; and means connecting said tuned circuit means and said gating means of one of said channels to said tuned circuit means and said gating means of the other of said channels.

3. A signaling circuit as in claim 1 wherein said gating means comprises a transistor and means biasing said transistor to amplify pulses of a single polarity appearing at said input means.

4. A signaling circuit as in claim 3 wherein said switching means in each of said channels comprises a transistor having a base connected to said input means of said channel, a collector connected to said output means of said channel, and an emitter connected to said feedback means.

5. A signaling circuit as in claim 4 wherein said output means of each of said channels comprises a source of potential, a capacitor connected to said source of potential, and output terminal, and a PNPN bistable switch connected between said capacitor and said collector and output terminal whereby an operation of said transistor operates said switch to apply the charge on said capacitor to said output terminal.

6. A signaling circuit as in claim 1 wherein said feedback means comprises a first source of potential, a second source of potential, and monostable multivibrator means connected to said sources of potential and said input and said switching means of each of said channels for applying the potentials from said sources to enable and disable said switching means in response to pulses at said output means of each of said channels.

7. A signaling circuit for transferring pulses to and from a line comprising in combination a line circuit; terminating circuitry including a source of pulses; a transmitter connecting said source to said line circuit, said transmitter including two distinct transmission channels each operable to produce an output to said line upon receipt of a pulse from said source, said channels each comprising a tuned circuit, means connected to said source and said tuned circuit operable in response to pulses from said source to initiate oscillations in said tuned circuit, and means operable in response to a pulse of a single polarity to produce an output pulse, said last-mentioned means having input means connected to said tuned circuit and output means connected to said line circuit; and a receiver coupling said line circuit to said terminating circuitry.

8. A signaling circuit as in claim 7 wherein said means operable in response to pulses of a single polarity comprises a transistor, and biasing means connected to said transistor operable to place said transistor in an amplifying condition on pulses of said single polarity and to place said transistor in a nonconducting condition at all other times.

9. A signaling circuit as in claim 8 wherein said tuned circuit includes a capacitor, an inductor, and a critical damping resistor, said resistor being connected in shunt with said input means of said transistor.

10. A signaling circuit as in claim 8 wherein said biasing means bias said transistors of said two channels to be operable on pulses of opposite polarity, and comprising means connecting said tuned circuits of both of said channels to both of said transistors.

11. A signaling circuit as in claim 10 wherein said means connecting said tuned circuits to both of said transistors include a resistor and a capacitor connected in shunt and to each of said transistors.

12. A signaling circuit as in claim 7 wherein said means to initiate oscillations in said tuned circuit comprises voltage dependent switching means connected to said source of pulses, and a capacitor and a source of potential connected to said switching means.

13. A signaling circuit as in claim 12 wherein said switching means includes a two-terminal PNPN bistable switch.

14. A transceiver circuit for transferring pulses to and from a line comprising in combination a source of pulses; a line circuit; a transmitter connecting said source to said line circuit; and a receiver circuit connected to said line circuit, said receiver circuit comprising a first and a second output means, a first and a second transistor respectively connected to said first and second output means to control the operation thereof, and biasing means biasing said first and second transistors to normally operate respectively upon input pulses from said line circuit of alternate polarity, said biasing means including monostable multivibrator means connected to said first and second transistors and to said first and second output means and operative in response to the operation of said output means to preclude the operation of said first and second transistors by overshoot pulses generated in said output means, said first and second output means each comprising a capacitor, a source of potential connected to said capacitor, and bistable switching means connected to said capacitor and said source of potential and operative to conduct in response to the operation of said first or said second transistor.

15. A transceiver circuit for transferring pulses to and from a line comprisng in combination a source of pulses; a line circuit; a transmitter connecting said source to said line circuit; and a receiver circuit connected to said line circuit, said receiver circuit comprising a first and a second output means, a first and a second transistor respectively connected to said first and second output means to control the operation thereof, and biasing means biasing said first and second transistors to normally operate respectively upon input pulses from said line circuit of alternate polarity, said biasing means including monostable multi-vibrator means connected to said first and second transistors and to said first and second output means and operative in response to the operation of said output means to disable said first and second transistors, said first and second output means each comprising a capacitor, a source of potential connected to said capacitor, and bistable switching means connected to said capacitor and said source of potential and operative to conduct in response to the operation of said first or said second transistor, said bistable switching means including a two-terminal PNPN bistable switch.

16. A transceiver circuit for transferring pulses to and from a line comprising in combination a source of pulses; a line circuit; a transmitter connecting said source to said line circuit; and a receiver circuit connected to said line circuit, said receiver circuit comprising a first and a second output means, a first and a second transistor respectively connected to said first and second output means to control the operation thereof, and biasing means biasing said first and second transistors to normally operate respectively upon input pulses from said line circuit of alternate polarity, said biasing means including monostable multivibrator means connected to said first and second transistors and to said first and second output means and operative in response to the operation of said output means to disable said first and second transistors, said monostable multivibrator means comprising an input terminal connected to said first and second output means; an output terminal connected to said first and second transistors; a capacitor; charging means connected to said input terminal and said capacitor for charging said capacitor in response to the operation of either of said output means; a first and a second source of potential; and switching means connected to said capacitor, said first and second sources of potential, and said output terminal for applying said first and said second potentials to said output terminal in response to the amount of charge on said capacitor.

17. A ransceiver circuit as in claim 16 wherein said charging means includes a third source of potential and a two-terminal PNPN bistable switch.

18. A transceiver circuit as in claim 16 wherein said switching means includes a normally saturated third transistor connected to said capacitor and operative to become nonconductive in response to a predetermined charge thereon.

19. A bipolar receiver comprising a first channel; a second channel, each of said channels including input means, output means, switching means connected to said input means operative in response to input pulses of a single polarity, and means connecting said switching means and said output means and operative in response to the operation of said switching means to produce an output pulse; and feedback means connected to said output means and switching means of each of said channels and responsive to an output pulse at either of said output means to preclude the operation of both of said switching means by overshoot pulses generated in said output means.

20. A receiver as in claim 19 wherein said switching means of each of said channels includes a transistor having a base, an emitter, and a collector, said base being connected to said input means, said collector being connected to said output means, and said emitter being connected to said feedback means; and biasing means connected to said transistor for maintaining said transistor nonconductive in the absence of an input pulse on said input means.

21. A bipolar receiver comprising a first channel and a second channel, each of said channels including input means, output means, switching means connected to said input means operative in response to input pulses of a single polarity, and means connecting said switching means and said output means and operative in response to the operation of said switching means to produce an output pulse; and feedback means connected to said output means and switching means of each of said channels for disabling said switching means in response to an output pulse at either of said output means, said switching means of each of said channels including a transistor having a base, an emitter, and a collector, said base being connected to said input means, said collector being connected to said output means, and said emitter being connected to said feedback means; and biasing means connected to said transistor for maintaining said transistor nonconductive in the absence of an input pulse on said input means, said input means including a transformer connected to said base of each of said transistors; and said output means of each of said channels includes a capacitor, a source of potential connected to said capacitor, a PNPN bistable switch connected to said capacitor and said collector of said transistor, and an output impedance connected to said switch.

22. A receiver as in claim 21 wherein said feedback means includes a capacitor connected to said switch; charging means connected to said capacitor and said switch and operative to charge said capacitor in response to a predetermined voltage at said output impedance; a first and a second source of reference potentials; and means connected to said emitters, said reference potentials, and said capacitor operative to apply said first or said second reference potentials to said emitters in response to the charge on said capacitor.

23. A receiver circuit as in claim 22 wherein said charging means comprises a PNPN third bistable switch and a third source of reference potential, and said means to apply said first and second reference potentials to said emitters comprises a transistor.

24. A bipolar transmitter circuit comprising in combination a first and a second transmission channel, each of said channels comprising a tuned circuit, means for initiating oscillations in said tuned circuit, a source of input pulses for operating said last-mentioned means, amplifying means connected to said tuned circuit operative in response to pulses therefrom of a single polarity, output means connected to said amplifying means, means biasing said amplifying means of each channel to operate in response to pulses of opposite polarity, and means connecting said tuned circuit of said first channel to said amplifying means of said second channel and said tuned circuit of said second channel to said amplifying means of said first channel.

25. A transmitter circuit as in claim 24 wherein said last-mentioned means includes a resistor and a capacitor connected in parallel.

26. A signaling circuit including a pulse source; output means; and a transmitter connected between said source and said output means, said transmitter comprising a first channel means operative responsive to pulses from said source to produce an output to said output means of a first polarity, a second channel means operative responsive to pulses from said source to produce an output to said output means of a second polarity, and means interconnecting said first and second channel means for operating said second channel means in response to the delivery thereto of an overshoot signal from said first channel means to deliver a forced overshoot pulse to said output means from said second channel means to neutralize said overshoot signal from said first channel means.

27. A signaling circuit including a bipolar transmitter, capable of producing output pulses from which the effect of overshoot may be eliminated, comprising a source of input pulses; a first and a second transmission channel, each of said channels including input means connected and operative to produce oscillations in response to predetermined pulses from said source of input pulses, and voltage dependent amplifying means connected to said input means and operative responsive to voltages of a single polarity; said amplifying means of said first channel being operative in response to voltages of one polarity and said amplifying means of said second channel being operative in response to pulses of opposite polarity; means connecting said input means and said amplifying means of said first channel to said input means and said amplifying means of said second channel for furnishing oscillations from either of said input means to both of said amplifying means, said connecting means including critical damping means; and an output transformer connected to each of said amplifying means.

28. A signaling circuit as in claim 27 wherein said amplifying means includes a transistor, and said critical damping means includes a critical damping resistor.

References Cited in the file of this patent

UNITED STATES PATENTS

| | | |
|---|---|---|
| 1,834,279 | Jarvis | Dec. 1, 1931 |
| 2,055,575 | Herman | Sept. 29, 1936 |
| 2,641,717 | Toth | June 9, 1953 |
| 2,644,895 | Lo | July 7, 1953 |
| 2,700,149 | Stone | Jan. 18, 1955 |
| 2,729,809 | Hester | Jan. 3, 1956 |